United States Patent [19]

Renaud et al.

[11] Patent Number: 5,794,761
[45] Date of Patent: Aug. 18, 1998

[54] SWITCHING DEVICE

[75] Inventors: Philippe Renaud, Saint-Sulpice; Benjamin Kloeck, Neuchâtel; Lucien Falco, Cressier, all of Switzerland

[73] Assignee: CSEM Centre Suisse D'Electronique et de Microtechnique SA, Neuchatel, Switzerland

[21] Appl. No.: 547,444

[22] Filed: Oct. 24, 1995

[30] Foreign Application Priority Data

Oct. 25, 1994 [FR] France ................. 94 12928

[51] Int. Cl.$^6$ ............ G02B 26/02; G02B 6/24; H01H 59/00
[52] U.S. Cl. ............ 200/181; 359/230; 385/16; 385/20
[58] Field of Search ............ 200/181; 359/223–226, 359/230; 73/514.01–514.39; 257/414–420; 385/16–20; 307/116

[56] References Cited

U.S. PATENT DOCUMENTS

| 4,160,141 | 7/1979 | Graf ................. 200/181 X |
| 4,229,732 | 10/1980 | Hartstein et al. ........ 340/815.4 |
| 4,383,255 | 5/1983 | Grandjean et al. ........ 340/815.62 X |
| 4,538,087 | 8/1985 | Germano et al. ........ 200/181 |
| 4,543,457 | 9/1985 | Petersen et al. ........ 307/117 X |
| 4,564,836 | 1/1986 | Vuilleumier et al. ........ 340/815.62 X |
| 4,662,746 | 5/1987 | Hornbeck ................. 359/223 |
| 4,680,968 | 7/1987 | Sodeikat ................. 73/651 |
| 4,778,254 | 10/1988 | Gilliland et al. ........ 359/230 |
| 4,805,038 | 2/1989 | Seligson ................. 359/230 X |
| 4,868,448 | 9/1989 | Kornrumpf ................. 200/181 X |
| 4,880,293 | 11/1989 | Gilliland, III et al. ........ 359/230 |
| 4,893,048 | 1/1990 | Farrall ................. 200/181 X |
| 4,959,515 | 9/1990 | Zavracky et al. ........ 200/181 |
| 5,024,500 | 6/1991 | Stanley et al. ........ 385/16 |
| 5,115,291 | 5/1992 | Stokes ................. 73/514.18 |
| 5,142,405 | 8/1992 | Hornbeck ................. 359/226 |
| 5,172,262 | 12/1992 | Hornbeck ................. 359/223 |
| 5,212,582 | 5/1993 | Nelson ................. 359/224 |
| 5,459,610 | 10/1995 | Bloom et al. ........ 359/226 X |

FOREIGN PATENT DOCUMENTS

| 0286337 | 10/1988 | European Pat. Off. ........ G02B 26/02 |
| 0463348 | 1/1992 | European Pat. Off. ........ G02B 26/08 |
| 2573678 | 5/1986 | France ................. B06B 1/04 |

OTHER PUBLICATIONS

C. Linder et al., "Surface micromachining", Journal of Micromechanics & Microengineering, vol. 2, (1992) pp. 122–132, Printed in the UK.

Primary Examiner—J. R. Scott

[57] ABSTRACT

A switching device comprises a swinging element (1) that is able to move between two end positions (A, B). Holding electrodes (4, 5) are placed in end positions (4, 5). A control circuit (8) controls the switching by generating signals of suitable voltage. Swinging element (1) is attached in an elastic manner (for example, by a flexible rod 2) in such a way that the elastic return force which tends toward a zero position (0) has, in an essential amplitude range, a higher value than the electrostatic force of attraction created by the control circuit and holding electrodes (4, 5) and acts in the opposite direction, in such a way that the switching time of the swinging element is determined primarily by its natural frequency and not by the magnitude of the electrostatic force of attraction.

25 Claims, 4 Drawing Sheets

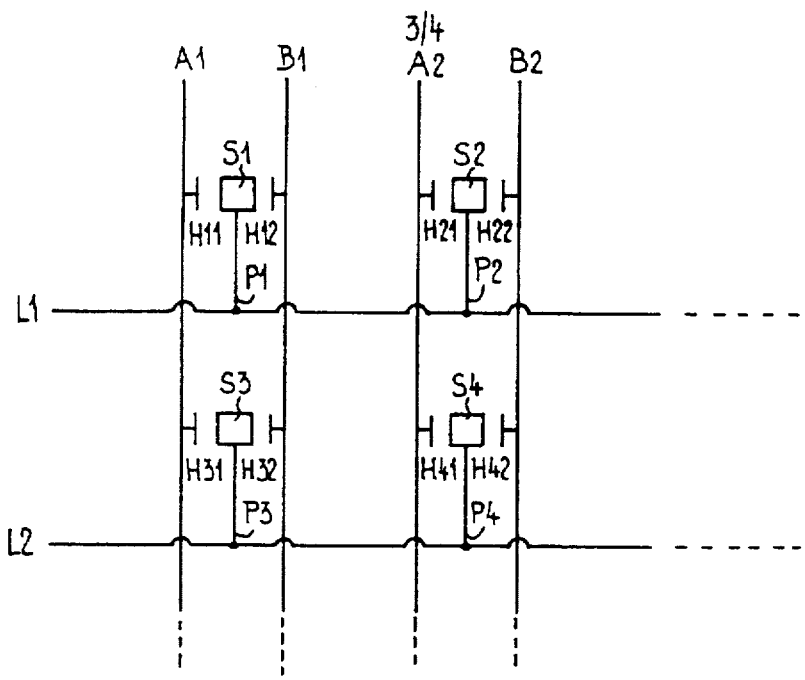
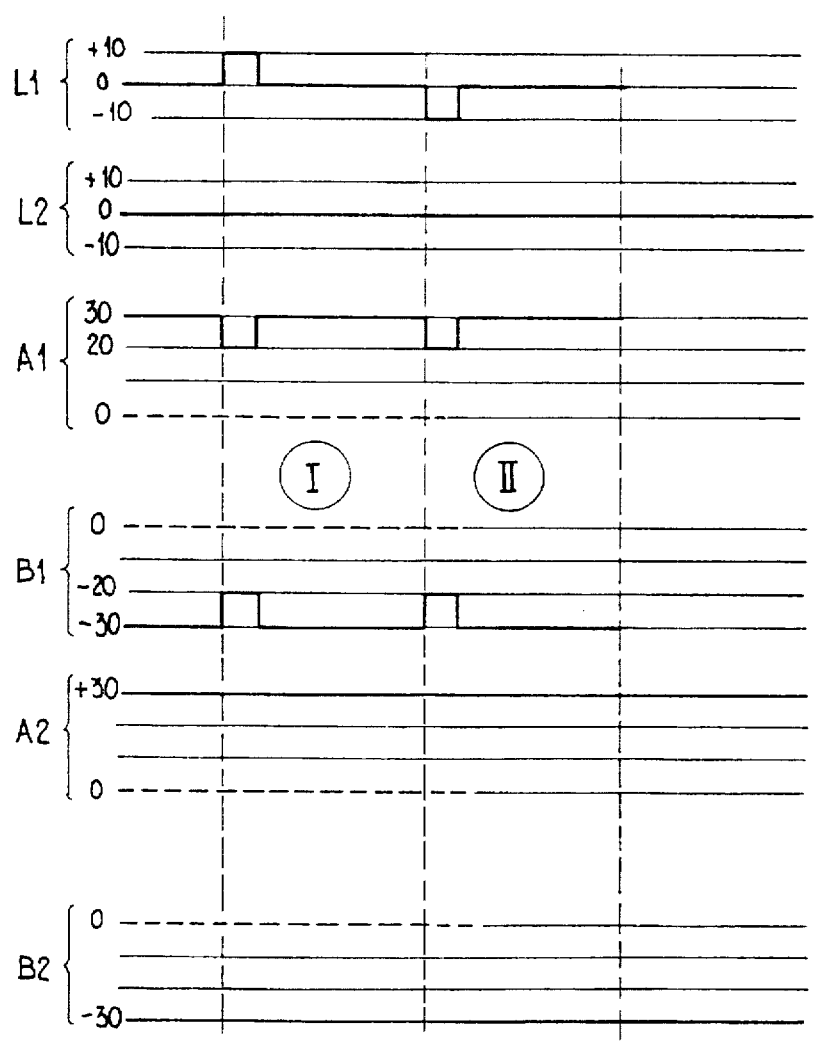
Fig. 6
Fig. 7

5,794,761

SWITCHING DEVICE

TECHNICAL FIELD OF THE INVENTION

This invention relates to a switching device that comprises a swinging element that can be moved back and forth between two end positions, stationary actuating electrodes that are located in these end positions, and a control circuit to act on the swinging element with electrostatic forces. In addition, the invention relates to a process for operating such a device, a switching unit that comprises a number of such switching devices, and an optical unit that comprises at least one such switching device.

PRIOR ART DESCRIPTION OF THE RELATED ART

A very wide variety of micromechanical structures that influence or switch, respectively, the paths of optical rays are known. The purpose of such structures is the control, processing, and storage of data from pixel-based images.

Document U.S. Pat. No. 4,229,732 (Hartstein et al.) or U.S. Pat. No. 5,142,405 (Hornbeck) describes so-called DMD (=deformable mirror device) devices, which can be used for the processing or storage of images. Such a DMD primarily comprises a number of reflective plates that are placed on a plane surface which can flip flop between predetermined positions under the influence or absence, respectively, of electrostatic forces. When the geometric optics are suitably designed, bright and dark image points can be produced in this way.

The reflective plates are suspended in an elastic manner above suitable cavities of the substrate, in such a way that they can rotate around an axis that is located in the plane of the two-dimensional reflective plate. Below each reflective plate, an electrode is placed that is able to attract the plate electrostatically and keep it in a deflected position. When switching occurs, the voltage between the reflective plates and the electrodes is to have such a value that the electrostatic field is sufficient to deflect the reflective plate. The micromechanical structures that are described in the mentioned documents are limited to relatively slight angular deviations. Consequently, the distances to be overcome by the electrostatic forces are small.

Micromechanical shutters for optical applications are known from document CH-633'902 or U.S. Pat. No. 4,383,255 (Grandjean et al.) and from document U.S. Pat. No. 4,564,836 (Vuilleumier et al.). Flaps are provided in order to be able to pivot 90° around axes located in the surface of the substrate. A recess that is used as free space for the pivoting motion is located below the flaps. Electrodes are placed in the recess to produce the electrostatic fields (which are directed primarily perpendicular to the surface of the substrate) to open the shutter. These structures also have the drawback that the size of the pivoting movement is limited by the voltages that can be produced.

A summary of the surface microstructures and their production can be found in, for example, the article "Surface Micromachining," C. Linder et al., J. Micromech. Microeng. 2 (1992), 122–132.

SUMMARY AND OBJECTS OF THE INVENTION

One of the objects of this invention is to create a switching device of the type mentioned at the beginning that makes it possible to obtain high switching speeds and greater switching travel lengths even with relatively low voltages.

The solution consists, according to the invention, in that the swinging element is held in an elastic manner, such that the value of an elastic return force which tends toward a zero position is greater, in an essential range of amplitudes, than the force of electrostatic attraction that is produced by the control circuit and one of the actuating electrodes and which acts in the opposite direction, so that the swinging element has a switching time that is primarily determined by its natural mechanical oscillation frequency.

Whereas, in the prior art, the suspension of the swinging element is initially calculated as a "passive" support and whereas the idea is to overcome the return force by electrostatic forces, the invention incorporates an "active" construction element that determines or dominates the switching time. The stiffness of the holding spring is selected, according to the invention, to be relatively high in order to produce a suitably high frequency and, consequently, a short switching time. The actuating electrodes are fed by voltages that are just high enough to be able to keep the swinging element in the end positions against the mechanical return force. As a general rule, the invention does not require complicated electrodes in comb form.

The elastic return force is typically greater, at least in half the amplitude range, than the electrostatic attraction force between the actuating electrode and the swinging element. When the switching device is operating normally, the ratios of the mechanical/electrical forces are such that the actuating electrodes can pick up the swinging element when it gets close to them. The electrostatic forces are not sufficient, according to the invention, to draw the swinging element from its zero position. On the basis of the proposed design, relatively large deviations can be achieved with modest holding voltages. The switching time does not suffer from this.

The invention lends itself particularly to micromechanical structures that are engraved in, or produced on the surface of, the substrate or are deposited on its surface.

The dimensions of such microstructures are typically in the range of submillimetric dimensions (for example, several hundred μm). However, the invention is not limited to such small dimensions. Rather, the principle of the electrostatic holding of an elastic element in its end positions and of the switching that is determined by the mechanical natural oscillation can be applied in general.

Micromechanical structures are preferably made of a crystalline or polycrystalline material, for example, polysilicon or metal. The processes for working such materials for the purpose of producing structures according to the invention are known in the art. The advantage of the materials mentioned above lies in their good elastic properties, on the one hand, and the ease with which they can be machined, on the other hand.

The swinging element is preferably a plate that is supported by a thin elastic attachment, with the plate being able to move laterally in the plane of the plate. In the microstructures according to the invention, the swinging elements can then move laterally in a plane that is predetermined by the surface of the substrate. The attachment comprises one or more flexible rod elements. The movable plate can, for example, shut or uncover an opening.

A hole in the substrate to allow a ray to pass is in a plane behind the swinging element between the zero position and one of the end positions. Depending on the position of the swinging element, the hole is opened or closed. Instead of a hole, a mirror which is covered or uncovered by the swinging element can be provided. Another variant consists in that the swinging element is itself reflective and its background is absorbent or transparent. The swinging element is then moved into or out of, respectively, the path of a focussed light ray and can therefore produce directed reflections.

To bring the swinging element from its zero position (where it is non-operational) to one of the actuating electrodes, special means are necessary which comprise, for example, excitation electrodes to bring the swinging element from its zero position into one of the end positions by means of natural oscillations. The excitation electrodes are located between the end positions and the zero position, and the swinging element can be inserted between the excitation electrodes. The periodic electrostatic forces that these electrodes exert act on the zero position with enough power to cause a significant deviation. Their action is significant in the zero position, unlike that of the actuating electrodes or holding electrodes, respectively. It is also conceivable that the excitation of the natural oscillation can be caused by the holding electrodes themselves.

Depending on how the shutter element is attached, it moves along curved or linear paths. If it is attached to a rod element, for example, it moves primarily along the arc of a circle. In contrast, if it is held on two opposite sides, it can be forced onto a linear path.

For example, the control circuit is electrically connected to an electrode that is formed on the swinging element, as well as to actuating or holding electrodes, in order to be able to control switching by lowering the voltage between the actuating electrode and the swinging element. Of course, the swinging element can be kept also to a constant potential.

A process for controlling a switching device of the type described is characterized by the fact that the swinging element is held by a holding voltage in an end position and released by a temporary reduction in the holding voltage between the swinging element and the electrode so that it can swing, on the basis of its natural oscillation, into the opposite end position where it is drawn in by the other actuating electrode (or by its holding voltage, respectively).

It is sufficient to lower the voltage until the swinging element escapes the (relatively small) zone of influence of the respective electrode. It generally will not be necessary to lower the voltage for longer than, e.g., one-quarter of the natural oscillation period (namely less than $\pi/2\Omega_0\Omega_0$= resonance frequency). In most cases, even one-eighth of the switching time or oscillation half-period will be quite sufficient.

As has already been mentioned, the swinging element is preferably activated by means of its excitation electrodes by applying to it a periodic electrical signal that corresponds to the natural frequency, until it reaches the zone of influence of a holding electrode and is drawn in by the latter.

To produce a switching unit, several switching devices according to the invention are connected to the control circuit by their swinging electrodes and/or their actuating electrodes through common conductors. A selected switching device can then be activated by lowering the voltage (reduction of the potential difference) on the conductors which intersect at the selected switching device. The switching devices are preferably arranged to form a regular two-dimensional grid, with the swinging electrodes or their corresponding actuating electrodes of the individual switching devices being connected by rows and columns. Such switching units are particularly useful for the generation or processing of images based on stored-bit patterns.

An optical unit according to the invention comprises at least one switching device of the described type which is placed as a controlled screen in the focal point of an optical-lens system. Another lens system which produces an image of the hole of the controlled screen in an image plane or, for example, on a light-sensitive film can be placed behind the switching device.

Other embodiments and combinations of advantageous characteristics will emerge from the following examples of embodiment and all of the claims.

BRIEF DESCRIPTION OF THE DRAWINGS

The drawings used to explain sample embodiments:

FIG. 6 shows a diagram of the connections for controlling a two-dimensional grid of switching devices according to the invention;

FIG. 7 shows a diagrammatic representation of switching signals to actuate a selected shutter of the switching unit according to FIG. 6;

DETAILED DESCRIPTION OF THE PREFERRED EMBODIMENTS

Figure 1:
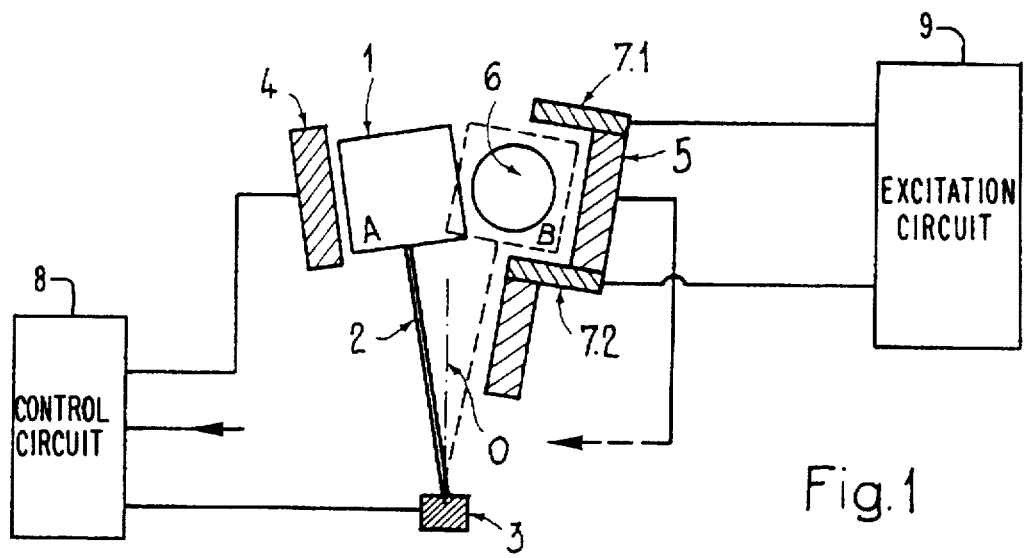
FIG. 1 shows a diagrammatic representation of a switching device according to the invention.

FIG. 1 shows, in diagrammatic form, the most important elements of a device according to the invention. A screen in the form of plate 1 is attached to one end of an elastic rod 2. The other end of rod 2 is clamped in an anchoring point 3.

Screen 1 and rod 2 represent an oscillating mechanical system whose natural frequency is determined by the geometric and material design of rod 2 and screen 1 (ratio between the elastic force and the oscillating weight). Screen 1 can move alternately between two end positions A, B. Holding electrodes 4, 5 are in end positions A, B and can hold screen 1 against the elastic return force.

Between zero line O and holding electrode 5, there is an opening 6 which is exposed when screen is 1 in end position A and which is sealed when screen 1 is in end position B. In this way, a path for optical rays can be opened or interrupted, respectively. The boundaries of the substrate in which hole 6 is bored is not shown in FIG. 1 for ease of illustration. For a better view of the hole, attention is made to FIG. 3, described later herein.

Holding electrodes 4, 5 and screen 1, which is also covered by an electrode, are electrically connected to a control circuit 8 which can switch the switching device. Also, excitation electrodes 7.1, 7.2, which extend from holding electrode 5 toward zero position O, are provided. They are connected to an excitation circuit 9. As will be explained below, excitation circuit 9 has the function of bringing screen 1 from passive zero position O to an operational position near one of the electrodes 4, 5 in cooperation with excitation electrodes 7.1, 7.2.

Figure 2A:
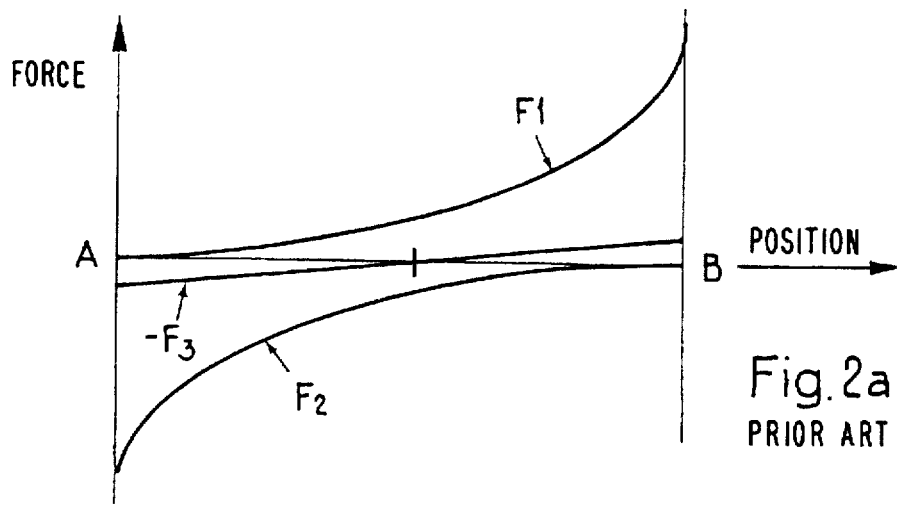
FIG. 2a shows a diagram of the forces as a function of movement according to the prior art.

FIG. 2a illustrates the ratios of forces in known micromechanical swinging elements. F1 and F2 represent the electrostatic forces, depending on the position, between the swinging element and one or the other, respectively, of the electrodes. F3 designates the return force that is produced in the swinging element (the rod) by mechanical deviation. In the prior art, the ratios of the forces are adjusted in such a way that electrostatic forces F1, F2 are large enough to overcome return force F3 in all cases and to bring the swinging element from the zero position to the respective end position. The switching speed is then determined by the value of the electrostatic force of attraction. In the prior art, high switching speeds are obtained only with the help of powerful fields or large voltages.

Figure 2B:
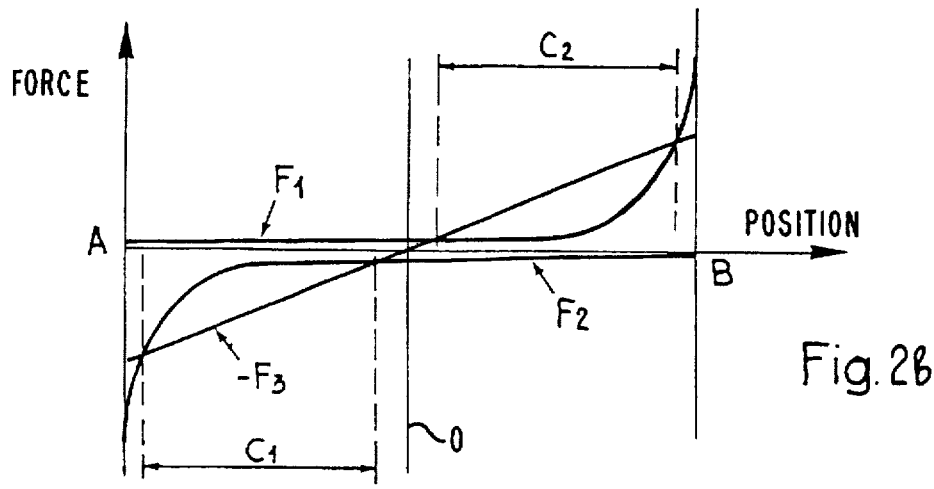
FIG. 2b shows a diagram of the forces as a function of movement according to the invention.

FIG. 2b illustrates the ratios of forces according to the invention. In contrast to the prior art, the return force, in an essential range of amplitudes (for example, C1 or C2, respectively), has a higher value than electrostatic forces of attraction F1 and F2, respectively, but of opposition direction. Electrostatic forces F1, F2, which increase very quickly when the distances decrease, are used only to hold the swinging element. The driving force to transport the swinging element over considerable distances of deviation is the mechanical force caused by the deformation in the swinging element or in its attachment, respectively.

In the region of zero position O, return force F3 exhibits a passage through zero but not electrostatic forces F1, F2 (considered separately). In contrast to the prior art, the electrostatic forces in the invention are not sufficient, however, to bring the swinging element from the zero position directly into end position A, B that is desired. To do this, special excitation electrodes 7.1, 7.2, which are located in front of holding electrode 5 and can then act with substantial forces on the swinging element when it is in the zero position, are provided in FIG. 1. To move the swinging element into one of two end positions A, B using the lowest voltages possible, excitation circuit 9 produces preferably periodic voltage signals which excite the swinging element into oscillation. The excitation is maintained until the swinging element can be picked up by one of two holding electrodes 4, 5.

Figure 3:
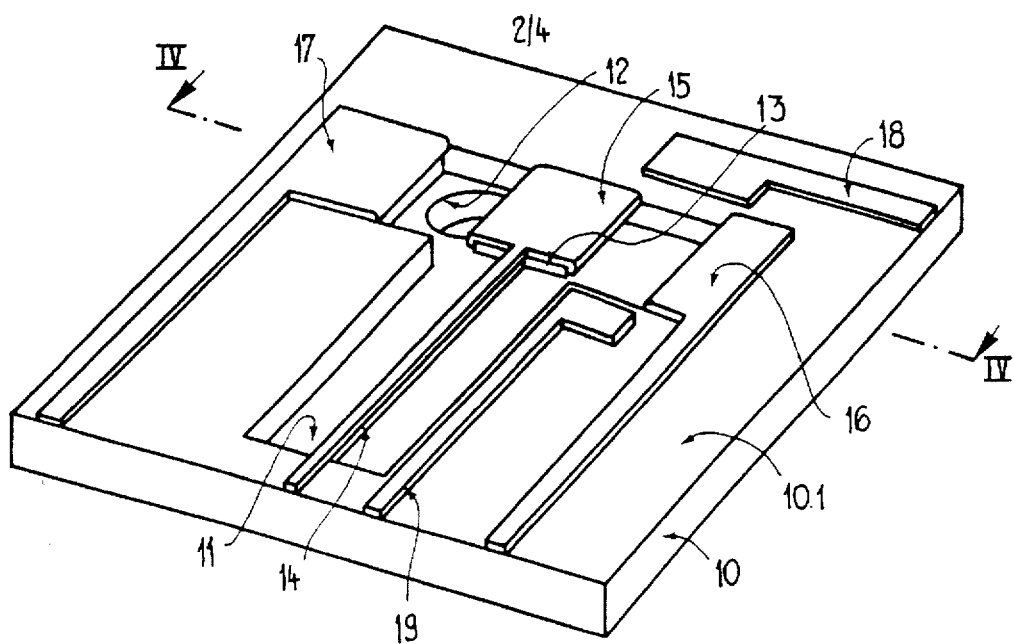
FIG. 3 shows a diagrammatic representation in perspective of a micromechanical structure according to the invention.

FIG. 3 shows an example of a micromechanical structure according to the invention. The structure described below is produced in a substrate 10 (made of, for example, silicon or a transparent material) according to methods known in the art (see, for example, the prior art cited at the beginning). The structure comprises a plate 13 that is square, for example (having a side length of 30 μm, for example, and a thickness of 2 μm, for example), which is attached to the end of a rod 14 (having a length of 200 μm, for example, and a crosswise dimension of about 2 μm×2 μm). Plate 13 and rod 14 can be made of, for example, polysilicon. Rod 14, being long and thin, is elastically deformable. In this example, the goal is to produce a swinging movement in a plane that is defined by main face 10.1 of substrate 10. The natural frequency of a mechanical oscillation in the above-mentioned plane is determined primarily by the dimensions of rod 14, the weight of plate 13, and the elasticity coefficient of the polysilicon. It is known that the stiffer the rod, the higher the natural frequency.

Plate 13 and rod 14 form a swinging element that is placed above a depression or a recess 11, in the shape of a T. In one of the arms of the T-shaped recess, substrate 10 comprises an opening 12.

Holding electrodes 16, 17 are placed at the ends of the crosswise arms of the T-shaped recess. The swinging element also comprises an electrode 15. In addition, excitation electrodes 18, 19 are provided at one of the arms of T-shaped recess 11. They extend as far as possible toward the zero position of the swinging element to put it into oscillation as easily as possible. It is also possible to provide excitation electrodes on both sides of the zero position.

Figure 4:
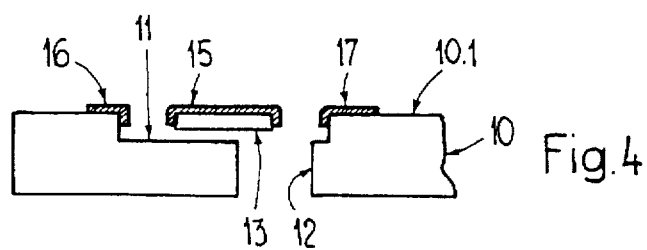
FIG. 4 shows a diagrammatic representation of a cross section of the structure according to FIG. 3.

FIG. 4 shows the structure of FIG. 3 along a cross section designated IV—IV. The asymmetrical arrangement of opening 12 relative to the zero position of the swinging element is clearly noted. Plate 13 is held at a distance of a few micrometers above the bottom of the recess. Electrodes 15, 16 and 17 preferably cover the lateral walls of the recess or plate 13.

The detailed production of the electrodes at the surface of the substrate is not described in detail because it is familiar to one skilled in the art.

Of course, plate 13 or its electrode 15, respectively, does not to come into direct contact with holding electrodes 17, 18. It is therefore necessary to provide insulating layers, bearings or other equivalent means, for example, on the inner walls of recess 11 in the region of holding electrodes 17, 18.

In the embodiment depicted in FIG. 3, plate 13 of the swinging element moves along a curved path. If this is not desired, it is possible to produce a structure according to, e.g., FIG. 5a, b. Analogously, in the first sample embodiment, a recess 21 (drawn hachured) is provided in a substrate 20. Above the recess, a screen in the form of a plate 22 is held in such a way that it can be moved linearly in a plane by two arms 24.1, 24.2. An opening 23 is produced in the bottom of recess 21 below screen 22. This opening is of such a size that it is half-sealed when screen 22 is in the rest position (according to FIG. 5a). When screen 22 is held by holding electrode 25, opening 23 is totally sealed. When screen 22 is held by holding electrode 26 from the front, opening 23 is open.

The particular feature of this embodiment is that square or rectangular screen 22 is held symmetrically by two arms 24.1, 24.2 in the shape of a U. In the upper part of FIG. 5b, above the dotted mid line, it has been shown how arm 24.1 is deformed to an almost triangular shape when screen 22 is held by holding electrode 25. The lower half of FIG. 5b, below the dotted mid line, shows the other case where the two branches of arm 24.2 are separated in the shape of a trapezoid. (Arms 24.1, 24.2 always deform naturally in a symmetrical way relative to one another.)

U-shaped arms 24.1, 24.2 are attached, in this example, to the adjacent corners of screen 22. Of course, other positions of the screen (for example, the center of a side) can also be used as connection sites.

Figures 5A, 5B:
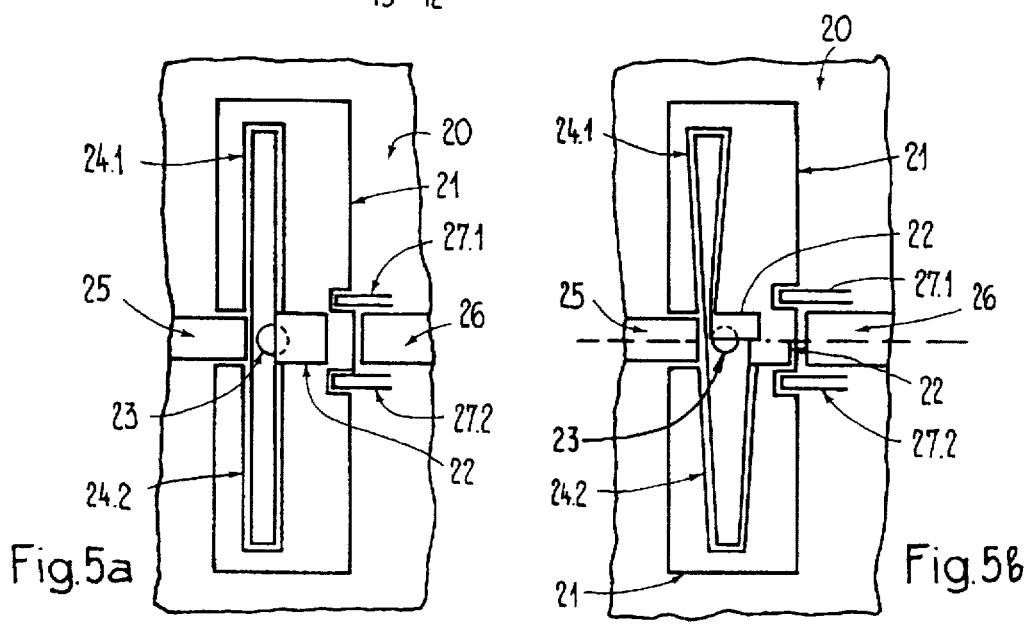
FIGS. 5a and 5b show a schematic representation of a micromechanical structure that has a shutter which can move linearly.

In addition, excitation electrodes 27.1, 27.2 are distinguished in FIG. 5a, b. They extend alongside holding electrode 26 toward screen 22. The latter can slide between excitation electrodes 27.1, 27.2.

The switching device according to the invention will preferably be used not individually but in combination with other identical devices that form an array. For example, a number of switching elements according to the invention are arranged to form a regular two-dimensional grid (for example, rectangular or honeycombed) and are controlled in a way that will be described below.

FIG. 6 shows four switching elements S1, . . . , S4 which are arranged in two rows and in two columns. Each switching element S1, . . . , S4 comprises two holding electrodes H11, H12; H21, H22; H31, H32 and H41, H42, respectively. A swinging electrode P1, . . . , P4 is between electrodes H11 and H12; . . . ; H41 and H42, respectively, of a switching element S1, . . . , S4. In the absence of voltage, swinging electrodes P1, . . . , P4 are in the zero position. In the operational state, they are held by one of two corresponding holding electrodes H11 or H12, . . . , H41 or H42.

Swinging electrodes P1, P2 of switching elements S1, S2 of the same row are connected to a common conductor L1. Analogously, swinging electrodes P3 and P4 are connected by a conductor L2. The holding electrodes are connected by columns: H11 and H31 to conductor A1, H12 and H32 to conductor B1, H21 and H41 to conductor A2 and H22 and H42 to conductor B2.

FIG. 7 shows diagrammatically an example of control signals. Without limiting generality, the holding voltage will be assumed to be 20 V.

In interval I, switch S1 is controlled in such a way that at the end of interval I, swinging electrode P1 is in contact with holding electrode H12 and in such a way that the positions of the other switches remain unchanged. At the beginning of interval I, conductor L1 is temporarily shifted from 0 to +10 V, for example, conductor A1 is simultaneously lowered from 30 V, for example, to 20 V, and conductor B1 is shifted from −30 V to −20 V. If the swinging electrode was previously held by holding electrode H11, it will disengage from this position because the voltage between H11 and P1 drops below the holding voltage. After completing a semi-oscillation, swinging electrode P1 is drawn by second holding electrode H12 because the necessary holding voltage of 20 V is present between the elements P1 and H12.

If swinging electrode P1 was already held by holding electrode H12 just prior to interval I before the switching, it would remain there because the voltage between L1 and B1 does not drop below the holding voltage (20 V) during the entire interval I.

Conductors L2, A2 and B2 remain at their normal voltage of 0 V, +30, and −30 V, respectively, during the switching mentioned. Switching elements S2, S3, S4 therefore cannot switch.

All of the signals that make it possible to switch swinging electrode P1 to holding electrode H11, if said swinging electrode is not already there, are represented in interval II. Conductors L1 and A1 are lowered by 10 V each, and conductor B1 is increased by 10 V.

A large grid of switching elements can be controlled in the manner described above.

Figure 8:
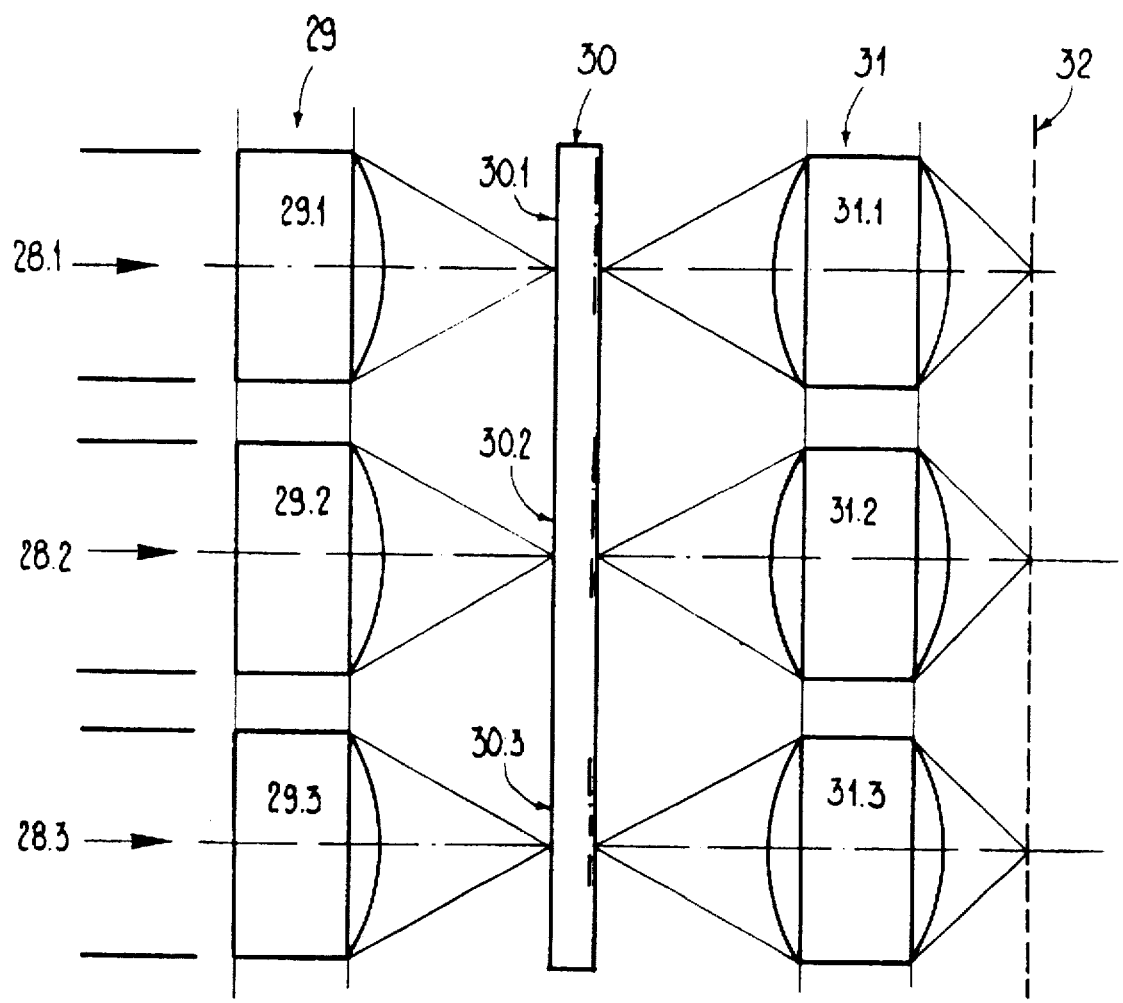
FIG. 8 shows a diagrammatic representation of a device for the generation or processing of images, respectively.

A further application of two-dimensional switching structures will be described with the aid of FIG. 8. Of course, in practice, not just three but many more optical processing paths are provided concurrently. Three light beams 28.1, . . . , 28.3 coming from the left in FIG. 8, are incident on a focussing system 29 that comprises a microlens 29.1, . . . , 29.3 for each incident light beam 28.1, . . . , 28.3. The light beams are concentrated in a common focussing plane in which a switching unit 30 according to the invention is placed. Switching unit 30 comprises a number of identical switching elements (30.1, . . . , 30.3 (for example, corresponding to that of FIG. 3). Light beams 28.1, . . . , 28.3 are therefore focussed in the passage openings of the switching elements. An image system 31 which is behind the switching unit in the form of a disk 30 produces an image of the passage openings on an image plane 32. Image system 31 can also consist of a number of microlenses 31.1, . . . , 31.3.

Images can be generated by using the optical device that is represented in FIG. 8 by addressing or positioning the switching elements 30. 1, . . . , 30.3 according to data representing an electronically stored image. It is also possible to modify an image that is defined by the intensity of light rays 28.1, . . . , 28.3. A support that comprises a light-sensitive film will be placed, for example, in the image plane.

The invention is not limited, of course, to the sample embodiments that are described. The attachment and the screen can be subject to multiple modifications. It is important that the geometric dimensions and the distribution of weight of the swinging element be adapted to the desired switching speed. It is possible to control the relatively long paths of the pendulum by modest voltages because the electrostatic forces of attraction do not need to act on the entire path of the pendulum.

Instead of screens moving in their own plane, it is also possible to use pivoting blades. The geometry of the movement carried out then corresponds to that known from the prior art, but their kinematics is distinguished in that there is a dynamic that is dominated by the elastic attachment and not by the electrostatic forces of attraction.

In this manner, the invention can be applied to, for example, the symmetrical pivoting structures described, for example, in CH-633'902 or U.S. Pat. No. 4,383,255 (FIG. 1) or U.S. Pat. No. 5,142,405 (FIG. 2 to 5).

The application of the micromechanical structures of the invention to optical modulation represents the preferred, but not exclusive, area of application. It is possible, for example, to produce switches that are similar to relays, whereby the swinging element makes contact with conductors of different currents in one or the other of the end positions. (The electrical insulation between the holding electrode and the swinging element is, of course, necessary, just as it was previously.)

Generally, the holding electrodes and the swinging element are made symmetrical relative to the zero position. Asymmetrical structures (for example, a variation of the actual length of the pendulum relative to the direction of deviation) are not ruled out, however.

In short, it should be considered that the invention has created a new concept of switching in which the switching time is not initially determined by the electrical voltage applied but by the natural mechanical oscillation frequency.

We claim:

1. A switching device which comprises:

a swinging element that is able to move back and forth between two end positions, the two end positions being on either side of a zero position;

an elastic member connecting said swinging element to a base, said elastic member allowing said swinging element to move back and forth between the two end positions;

stationary actuating electrodes producing electrostatic forces of attraction to said swinging element when said swinging element is at the end positions, the forces of attraction acting away from the zero position; and a control circuit for controlling the electrostatic forces of attraction;

wherein said elastic member provides a return force that acts toward the zero position, the return force being greater than the force of electrostatic attraction produced by said control circuit and one of said actuating electrodes such that said swinging element has a switching time based upon its natural mechanical oscillation frequency.

2. The switching device according to claim 1, wherein the return force is greater than the electrostatic force of attraction of said actuating electrodes for at least half of the region of movement of said swinging element.

3. The switching device according to claim 1, wherein said switching device is produced in the form of a micromechanical structure, said device further comprising a substrate, said swinging element and said actuating electrodes being micromachined into said substrate.

4. The switching device according to claim 3, wherein said substrate includes a crystalline or polycrystalline material.

5. The switching device according to claim 3, wherein said substrate includes polysilicon.

6. The switching device according to claim 3, wherein said substrate includes metal.

7. The switching device according to claim 3, wherein an opening is provided in a plane of said substrate behind said swinging element between the zero position and one of the end positions, with the opening being open or closed depending on the position of said swinging element.

8. The switching device according to claim 7, further comprising a light source directing light rays toward the opening, such that the light rays pass or are blocked by said swinging element depending on the position of said swinging element.

9. The switching device according to claim 1, wherein said swinging element comprises a screen that is held by said elastic member such that said screen can be moved laterally in a defined plane.

10. The switching device according to claim 9, wherein said elastic member comprises at least one flexible rod element in the defined plane.

11. The switching device according to claim 9, wherein said screen is planar and lies in the defined plane.

12. The switching device according to claim 1, further comprising at least one excitation electrode for imposing a force on said swinging element in order to move said swinging element from the zero position into one of the end positions.

13. The switching device according to claim 12, wherein said excitation electrode produces electrostatic forces which begin a natural mechanical oscillation of said swinging element.

14. The switching device according to claim 12, wherein a pair of said excitation electrodes are provided adjacent one of the actuating electrodes.

15. The switching device according to claim 1, further comprising an electrode arranged on said swinging element, and wherein said control circuit is electrically connected to said electrode arranged on said swinging element and to said actuating electrodes to control switching by lowering the voltage between one of said actuating electrodes and said swinging element.

16. The switching device according to claim 1, further comprising a light blocking element behind said swinging element, said light blocking element having an opening between the zero position and one of the end positions of said swinging element, such that the opening is opened or closed depending on the position of said swinging element.

17. The switching device according to claim 16, further comprising a light source directing light rays toward the opening, such that the light rays pass or are blocked by said swinging element depending on the position of said swinging element.

18. A switching unit that comprises a plurality of switching devices, each of the switching devices comprising:

a swinging element that is able to move back and forth between two end positions, the two end positions being on either side of a zero position;

an elastic member connecting said swinging element to a base, said elastic member allowing said swinging element to move back and forth between the two end positions; and stationary actuating electrodes producing electrostatic forces of attraction to said swinging element when said swinging element is at the end positions, the forces of attraction acting away from the zero position;

wherein said elastic member provides a return force that acts toward the zero position, the return force being greater than the force of electrostatic attraction produced by said control circuit and one of said actuating electrodes such that said swinging element has a switching time based upon its natural mechanical oscillation frequency, and wherein said switching unit further comprises:

a control circuit for controlling the electrostatic forces of attraction;

wherein the swinging electrodes or their actuating electrodes of several of the switching devices are connected by common conductors to said control circuit, whereby a selected switching device may be actuated by lowering the voltage on selected conductors that are connected to the selected switching device.

19. The switching unit according to claim 18, wherein said switching devices are arranged to form a regular two-dimensional grid, and wherein swinging electrodes or their actuating electrodes of said switching devices are connected in the grid by rows or columns, respectively.

20. An optical unit that comprises at least one switching device for selectively blocking and passing optical signals, said switching device comprising:

a swinging element that is able to move back and forth between two end positions in order to block or expose a passage opening, the passage opening permitting optical signals to pass through, the two end positions being on either side of a zero position;

an elastic member connecting said swinging element to a base, said elastic member allowing said swinging element to move back and forth between the two end positions; and stationary actuating electrodes producing electrostatic forces of attraction to said swinging element when said swinging element is at the end positions, the forces of attraction acting away from the zero position;

wherein said elastic member provides a return force that acts toward the zero position, the return force being greater than the force of electrostatic attraction produced by said control circuit and one of said actuating electrodes such that said swinging element has a switching time based upon its natural mechanical oscillation frequency, and wherein said optical unit further comprises:

a control circuit for controlling the electrostatic forces of attraction;

wherein said optical unit constitutes a controlled screen, said optical unit further comprising an optical lens system having its focal plane in or near a plane of said controlled screen.

21. The optical unit according to claim 20, wherein said optical lens system is a first lens system which focusses at least one light beam on a passage opening of a switching device and wherein a second lens system is provided behind the passage openings, such that the second lens system transmits the light beam passing through the opening to an image plane.

22. The optical unit according to claim 21, further comprising a source of the at least one light beam.

23. A process for controlling a switching device having a swinging element, an elastic member connecting the swinging element to a base and allowing the swinging element to move back and forth between two end positions, the two end positions being on either side of a zero position, stationary actuating electrodes respectively adjacent the end positions producing electrostatic forces of attraction to the swinging element when the swinging element is at the end positions, the forces of attraction acting away from the zero position, and a control circuit for controlling the electrostatic forces of attraction, comprising the steps of:

providing a holding voltage to a first one of the actuating electrodes when the swinging element is at a first one of the end position, the holding voltage producing a voltage difference between the first actuating electrode and the swinging element thereby creating an electrostatic force of attraction to the swinging element, the force of attraction being greater than a return force of the elastic member acting toward the zero position;

releasing the swinging element from its held position at the end position by temporarily reducing the voltage difference between the swinging element and the actuating electrode, such that the swinging element can oscillate to the other end position under natural mechanical oscillation due to the return force of the elastic member, the return force being greater than the electrostatic force of attraction for at least a portion of the path of movement of the swinging element between the two end positions; and providing a new holding voltage to the second one of the actuating electrodes when the swinging element is at the second end position, the holding voltage producing a voltage difference between the second actuating electrode and the swinging element thereby creating an electrostatic force of attraction to the swinging element, the force of attraction being greater than a return force of the elastic member acting toward the zero position.

24. The process according to claim 23, wherein the voltage is lowered for a period of time that is shorter than $\pi/2\Omega_o$, with $\Omega_o$ being the natural oscillation frequency.

25. The process according to claim 23, further comprising the step of providing excitation electrodes with natural frequency Wo of the swinging element until the swinging element can be drawn in by the electrostatic force at one of the actuating electrodes.

* * * * *